US012586287B2

(12) United States Patent
Anson et al.

(10) Patent No.: US 12,586,287 B2
(45) Date of Patent: Mar. 24, 2026

(54) METHOD OF OPERATING SHARED GPU RESOURCE AND A SHARED GPU DEVICE

(71) Applicant: Huawei Cloud Computing Technologies Co., Ltd., Guizhou (CN)

(72) Inventors: Omer Anson, Hod Hasharon (IL); Dima Kuznetsov, Hod Hasharon (IL)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 137 days.

(21) Appl. No.: 18/540,069

(22) Filed: Dec. 14, 2023

(65) Prior Publication Data

US 2024/0119656 A1 Apr. 11, 2024

Related U.S. Application Data

(63) Continuation of application No. PCT/EP2021/065878, filed on Jun. 14, 2021.

(51) Int. Cl.
*G06T 15/00* (2011.01)
*G06F 8/41* (2018.01)

(52) U.S. Cl.
CPC .............. *G06T 15/005* (2013.01); *G06F 8/41* (2013.01)

(58) Field of Classification Search
CPC ......... G06T 15/005; G06F 8/41; G06F 21/51; G06F 21/71; G06F 9/5044
See application file for complete search history.

(56) References Cited

U.S. PATENT DOCUMENTS

| | | | |
|---|---|---|---|
| 10,423,463 B1 | 9/2019 | Wilt | |
| 2015/0370589 A1* | 12/2015 | Bidarkar | G06F 12/0802 718/1 |
| 2017/0256017 A1* | 9/2017 | Gandhi | G06T 1/60 |
| 2022/0100583 A1* | 3/2022 | Lal | G06F 9/5083 |

* cited by examiner

*Primary Examiner* — Michelle Chin
(74) *Attorney, Agent, or Firm* — Conley Rose, P.C.

(57) ABSTRACT

A method of operating a shared GPU device includes receiving GPU software from each of one or more tenants sharing the GPU device. The method further includes for each received software, verifying the software is safe to execute, and compiling each software that is verified as safe. The method further includes executing each compiled software in turn using the shared GPU device.

20 Claims, 4 Drawing Sheets

100

RECEIVING GPU SOFTWARE FROM EACH OF ONE OR MORE TENANTS SHARING GPU DEVICE
102

FOR EACH RECEIVED SOFTWARE, VERIFYING SOFTWARE IS SAFE TO EXECUTE, AND COMPILING EACH SOFTWARE THAT IS VERIFIED AS SAFE
104

EXECUTING EACH COMPILED SOFTWARE IN TURN USING SHARED GPU DEVICE
106

100

RECEIVING GPU SOFTWARE FROM EACH OF ONE
OR MORE TENANTS SHARING GPU DEVICE
102

FOR EACH RECEIVED SOFTWARE, VERIFYING
SOFTWARE IS SAFE TO EXECUTE, AND
COMPILING EACH SOFTWARE THAT IS VERIFIED
AS SAFE
104

EXECUTING EACH COMPILED SOFTWARE IN
TURN USING SHARED GPU DEVICE
106

METHOD OF OPERATING SHARED GPU RESOURCE AND A SHARED GPU DEVICE

CROSS-REFERENCE TO RELATED APPLICATIONS

This is a continuation of International Patent Application No. PCT/EP2021/065878 filed on Jun. 14, 2021, which is hereby incorporated by reference in its entirety.

TECHNICAL FIELD

The present disclosure relates generally to the field of high-performance computing systems; and more specifically, to a method of operating a shared graphics processing unit (GPU) resource (e.g., sharing of GPU resources among tenants) and a shared GPU device.

BACKGROUND

Typically, in a cloud storage of data, every customer (or user) wants to have GPU resources. Currently, GPU resources cannot be shared among customers because customers may see other customers' data. There is no virtual memory associated with the GPU resources. Generally, all memory spaces associated with the GPU resources belong to a single generic memory space. Pointers from any kind of memory can be converted or casted to the generic memory space which then can be further casted to any kind of memory. Alternatively stated, any customer may be able to reach or access a given memory that does not belong to that customer. Therefore, side channel and covert channel attacks do exist.

Currently, the physical engine is packaged in an installation package of an application and is downloaded and installed on a terminal device by a user. When the user runs the application, the physical engine runs accordingly. As users have increasingly high requirements on virtual pictures and a sense of reality of virtual characters, an amount of data that needs to be physically simulated by the physical engines also increases. However, a processing capability of the terminal device is limited, and computation of the physical engine is limited by the capability of the terminal device. As a result, lagging or stuttering occurs during running of the application, severely affecting user experience. In addition, when a plurality of users participate in a same virtual scene, because physical simulation results obtained by physical engines corresponding to the plurality of users are not shared, the plurality of physical engines corresponding to the plurality of users obtain a plurality of identical physical simulation results, resulting in a waste of computing resources.

Therefore, in light of the foregoing discussion, there exists a need to overcome the aforementioned drawbacks associated with the conventional methods of using the GPU resources.

SUMMARY

The present disclosure provides a method of operating a shared GPU device and the shared GPU device. The present disclosure provides a solution to the existing problem of inefficient and inadequate usage of the GPU resources. An aim of the present disclosure is to provide a solution that overcomes at least partially the problems encountered in other approaches, and provide an improved method of operating a shared GPU device and an improved shared GPU device.

The object of the present disclosure is achieved by the solutions provided in the enclosed independent claims. Advantageous implementations of the present disclosure are further defined in the dependent claims.

In one aspect, the present disclosure provides a method of operating a shared GPU device. The method comprises receiving GPU software from each of one or more tenants sharing the GPU device. For each received software, the method further comprises verifying the software is safe to execute, and compiling each software that is verified as safe and executing each compiled software in turn using the shared GPU device.

The disclosed method provides an adequate and efficient usage of the shared GPU device by allowing each of the one or more tenants (or customers or clients) to simultaneously share the GPU device in comparison to a conventional approach in which a single tenant is allowed to consume a whole GPU device resulting into an inefficient usage of the whole GPU device. The disclosed method requires no expensive context switches. Moreover, the method provides complete isolation between each of the one or more tenants and hence, provides data protection to each of the one or more tenants. The data of each of the one or more tenants is protected from any leakage or temperedness. Additionally, the method requires no hardware support.

In an implementation form, receiving the GPU software includes receiving the software in source form or an intermediate representation, IR.

The reception of the GPU software in the source form or in the IR form eases the verification of the GPU software.

In a further implementation form, receiving the GPU software includes receiving instructions to improve a speed of the verification.

The received instructions improve the speed of the verification of the GPU software.

In a further implementation form, receiving the GPU software includes receiving a cryptographically signed artefact indicating that the software has previously been verified.

The cryptographically signed artefact supports a cost-effective verification of the GPU software.

In a further implementation form, verifying the software includes checking one or more entry code blocks to determine one or more memory addresses accessed by the code block, wherein the verification fails if an unsafe memory address is accessed.

The checking of the one or more entry code blocks leads a simple verification of the GPU software hence, a lot of GPU codes may be reused.

In a further implementation form, verifying the software includes, for each entry code block: following a path of code blocks that can be accessed from the entry code block, iterating until a steady state of repeated code blocks is reached, and checking memory accessed by all code blocks in the steady state; wherein the verification fails if a steady state cannot be reached or an unsafe memory address is accessed.

The checking of each entry code block results into a more accurate verification of the GPU software.

In a further implementation form, verifying the software includes providing a compiled artefact to the respective tenant to confirm verification.

After receiving the compiled artefact, the respective tenant confirms the verification of the GPU software.

In a further implementation form, the artefact is cryptographically signed and configured to be used for re-verification of the respective software.

The compiled artefact is cryptographically signed that leads reuse of the compiled artefact for re-verification of the GPU software.

In a further implementation form, the artefact is configured as a pointer to a compilation result stored remotely.

The artefact is configured as the pointer to the compilation result that leads a fast verification when the GPU software is re-used.

In a further implementation form, executing the compiled software includes storing each compiled software in a host driver, and supplying each software to the GPU in turn for execution.

The storage of each compiled software in the host driver and supply each software to the GPU in turn for execution results into a fast execution of the GPU software.

In a further implementation form, executing the compiled software comprises restricting available functionality of the GPU to exclude one or more functions that cannot be verified.

Restricting available functionality of the GPU leads an easier verification of the GPU software.

In another aspect, the present disclosure provides a shared GPU device configured to receive GPU software from each of one or more tenants sharing the GPU device. For each received software, the shared GPU device is further configured to verify the software is safe to execute, and compile each software that is verified as safe. The shared GPU device is further configured to execute each compiled software in turn using the shared GPU device.

The shared GPU device enables each of the one or more tenants to simultaneously share the GPU without allowing a single tenant to consume a whole GPU. The shared GPU device requires no expensive context switches. Moreover, the shared GPU device provides complete isolation between each of the one or more tenants and hence, provides data protection to each of the one or more tenants. The data of each of the one or more tenants is protected against any leakage or temperedness. Additionally, the shared GPU device achieves all the advantages and effects of the method of the present disclosure.

It is to be appreciated that all the aforementioned implementation forms can be combined.

It has to be noted that all devices, elements, circuitry, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
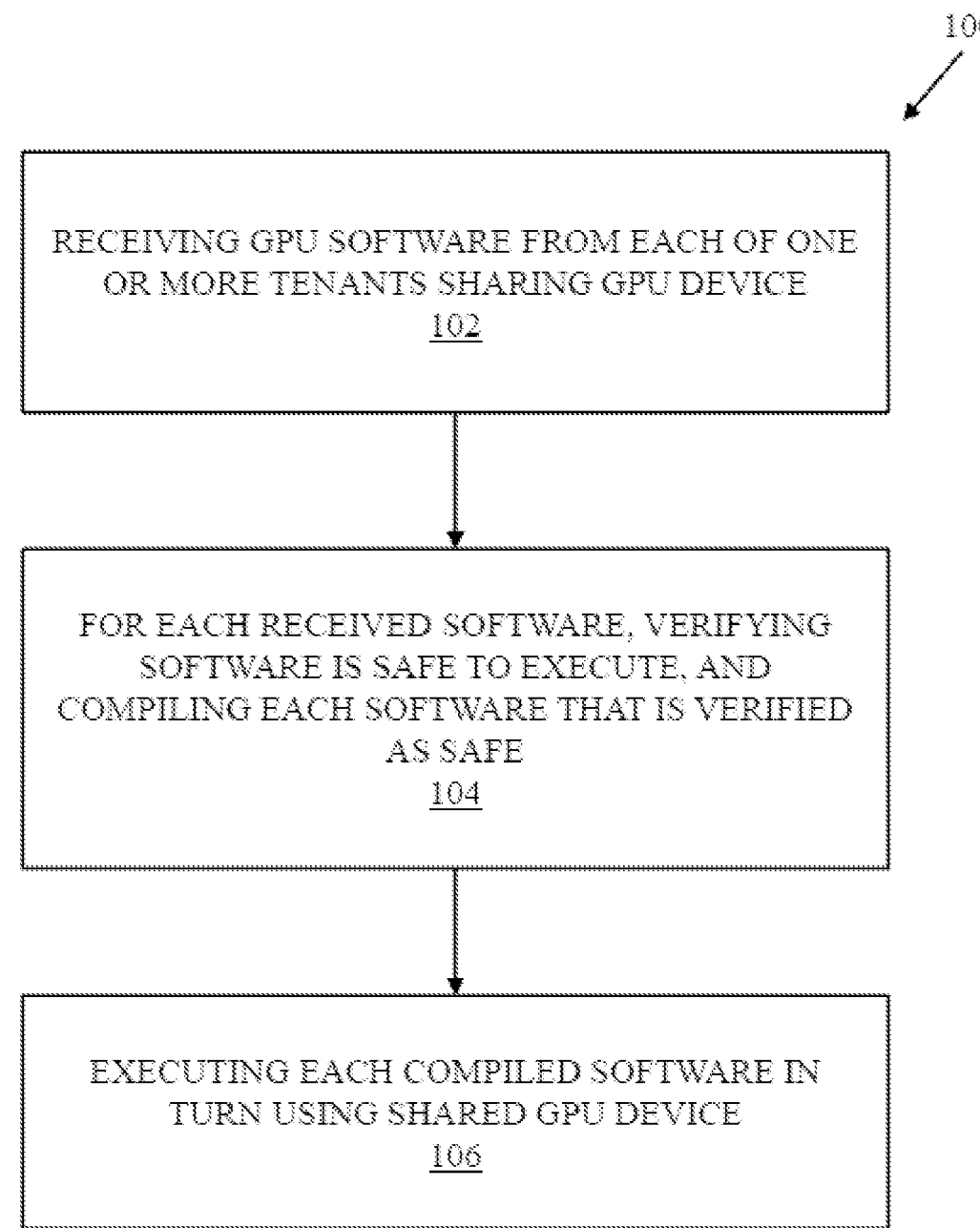
FIG. 1 is a flowchart of a method of operating a shared GPU device, in accordance with an embodiment of the present disclosure.

FIG. 1 is a flowchart of a method of operating a shared GPU device, in accordance with an embodiment of the present disclosure. With reference to FIG. 1, there is shown a method 100 of operating a shared GPU device. The method 100 includes steps 102 to 106. The method 100 is executed by a shared GPU device, described in detail, for example, in FIG. 2.

The present disclosure provides a method 100 of operating a shared GPU device, comprising: receiving GPU software from each of one or more tenants sharing the GPU device; for each received software, verifying the software is safe to execute, and compiling each software that is verified as safe; and executing each compiled software in turn using the shared GPU device.

The method 100 enables the one or more tenants (or customers) to share the GPU device without consuming a whole GPU (or a complete GPU device) and without any hardware support. Additionally, the method 100 provides complete isolation between the one or more tenants. Alternatively stated, customers cannot read and write each other's data by using the method 100.

At step 102, the method 100 comprises receiving GPU software from each of one or more tenants sharing the GPU device. Each of the one or more tenants sharing the GPU device is configured to provide the GPU software for compilation. Generally, the GPU software may be defined as a computing technology that is designed for parallel processing. The GPU software is used in a wide range of applications, such as graphics and video rendering. Further, each of the one or more tenants (or customers) is presented with the GPU software. Each of the one or more tenants (or customers) is configured to interact with the shared GPU device using known application programming interfaces (APIs), for example, compute unified device architecture (CUDA) or open computing language (OpenCL), etc. Generally, OpenCL is defined as an open standard for cross platform parallel processing. The OpenCL provides an API that allows software programs to access multiple processors simultaneously to perform parallel processing. Examples of the processors include, GPUs, central processing units (CPUs), digital signal processors (DSPs), and the like.

At step 104, the method 100 further comprises for each received software, verifying the software is safe to execute, and compiling each software that is verified as safe. For each received software, such as the GPU software received from each of the one or more tenants is analyzed by use of a compiler. The compiler verifies that the GPU software is safe to execute. After verification, the compiler compiles the verified GPU software and returns a compiled artefact. In a case, the compiler may fail compilation if the GPU software cannot be verified as safe to execute. But sometimes, the GPU software is safe to execute but cannot be verified as safe. For example, in another case, the compilation fails if the compiler failed to verify the GPU software even though the GPU software is safe to execute. The GPU software may also be referred to as a GPU application or simply a software or a program(s).

At step 106, the method 100 further comprises executing each compiled software in turn using the shared GPU device. The compiled GPU software is further executed using the shared GPU device.

In accordance with an embodiment, receiving the GPU software includes receiving instructions to improve a speed of the verification. Besides receiving the GPU software, the instructions required to improve the speed of the verification of the GPU software are also received. The instructions may correspond to a suggested order to access one or more code blocks in the GPU software. Moreover, the instructions include one or more initialization values for the GPU software (or the software).

In accordance with an embodiment, receiving the GPU software includes receiving a cryptographically signed artefact indicating that the software has previously been verified. Upon verification and compilation of the GPU software, the compiler returns the compiled artefact. The compiled artefact may be the cryptographically signed artefact which indicates that the GPU software (or the software) has already been verified as safe to execute. Thereafter, the GPU software can be re-used without re-verification.

In accordance with an embodiment, verifying the software includes checking one or more entry code blocks to determine one or more memory addresses accessed by the code block, wherein the verification fails if an unsafe memory address is accessed. Before execution of the GPU software, the GPU software (or the software) is verified as safe to execute by the compiler. The verification of the software (i.e., the GPU software) includes checking the one or more entry code blocks of the GPU software to determine the one or more memory addresses accessed by the one or more entry code blocks. In a case, if any unsafe memory address is accessed, the verification of the GPU software fails.

In accordance with an embodiment, verifying the software includes, for each entry code block: following a path of code blocks that can be accessed from the entry code block, iterating until a steady state of repeated code blocks is reached, and checking memory addresses accessed by all code blocks in the steady state; wherein the verification fails if a steady state cannot be reached or an unsafe memory address is accessed. The verification of the GPU software includes checking the one or more entry code blocks of the software. The checking of the one or more entry code blocks includes checking of each entry code block. The checking of each entry code block includes following the path of code blocks that can be accessed from the entry code block. The checking of each entry code block further includes iteratively following the path of code blocks until the steady state of repeated code blocks is reached and checking all the memory addresses that are accessed by all the code blocks in the steady state. However, the verification of the GPU software fails if the steady state cannot be reached or the unsafe memory address is accessed. In another embodiment, other techniques for verifying the GPU software may also be used, such as weakest pre-condition and strongest post-condition, symbolic and concolic executions, abstract interpretation, bounded model checking, incremental construction of inductive clauses for indubitable correctness, and the like.

In accordance with an embodiment, verifying the software includes providing a compiled artefact to the respective tenant to confirm verification. The compiler verifies that the GPU software is safe to execute. During verification, the compiler provides the compiled artefact to the respective tenant to confirm verification.

In accordance with an embodiment, the artefact is cryptographically signed and configured to be used for re-verification of the respective software. The artefact (or the compiled artefact) is cryptographically signed and can be used for re-verification of the respective software (i.e., the GPU software). Generally, a cryptographical sign may be defined as a digital signature (or a cryptographic value) that is calculated from one or more data values and a secret key that is known only to the shared GPU provider and used for data authentication.

In accordance with an embodiment, the artefact is configured as a pointer to a compilation result stored remotely. The artefact (i.e., the compiled artefact) is configured to as the pointer or a handle to the compilation result. The compilation result is stored remotely, may be on a host server. The compilation result may include syntactic errors and validation errors and such errors are provided to the respective tenant to fix them. The respective tenant (or the respective customer) cannot modify the pointer or the handle to the compilation result after compilation. Additionally, the compiled artefact may include a verification proof that allows a fast verification of the GPU software when the GPU software is reused. However, sometimes, the verification proof becomes invalid if the GPU software is changed.

In accordance with an embodiment, executing the compiled software includes storing each compiled software in a host driver, and supplying each software to the GPU in turn for execution. After verification and compilation of the GPU software, the compiled GPU software is firstly stored in the host driver and thereafter, the compiled GPU software is supplied to the GPU for execution. Alternatively stated, the tenant is configured to tell the GPU to execute the complied GPU software on given buffers. Moreover, only the verified GPU software can run on the GPU.

In accordance with an embodiment, executing the compiled software comprises restricting available functionality of the GPU to exclude one or more functions that cannot be verified. Restricting available functionality of the GPU means that the one or more tenants are allowed to use only limited subset of GPU functionality to exclude the one or more functions that cannot be verified. Alternatively stated, the restricting available functionality of the GPU means to ease the verification of the programs which are verifiable or more safe programs can be verified.

Thus, the method 100 provides an adequate and efficient usage of the shared GPU device by allowing each of the one or more tenants (or customers or clients) to simultaneously share the GPU device in comparison to a conventional approach in which a single tenant is allowed to consume a whole GPU device resulting into inefficient usage of the whole GPU device. The method 100 requires no expensive context switches. Moreover, the method 100 provides complete isolation between each of the one or more tenants and hence, provides data protection to each of the one or more tenants. The data of each of the one or more tenants is protected from any leakage or temperedness. Alternatively stated, the one or more tenants cannot read and write each other's data by using the method 100. Additionally, the method 100 requires no hardware support. The method 100 is based on a basic ability of a device driver (e.g., a driver of the shared GPU device) to run a single application and the single application is an amalgamation of one or more programs associated with the one or more tenants. Additionally, the method 100 provides a simple verification of the GPU software and further allows a lot of GPU codes for reuse. Examples of the GPU codes may include, but are not limited to, Tensorflow, pyTorch, Keras, and the like.

The steps 102 to 106 are only illustrative and other alternatives can also be provided where one or more steps are added, one or more steps are removed, or one or more steps are provided in a different sequence without departing from the scope of the claims herein.

Figure 2:
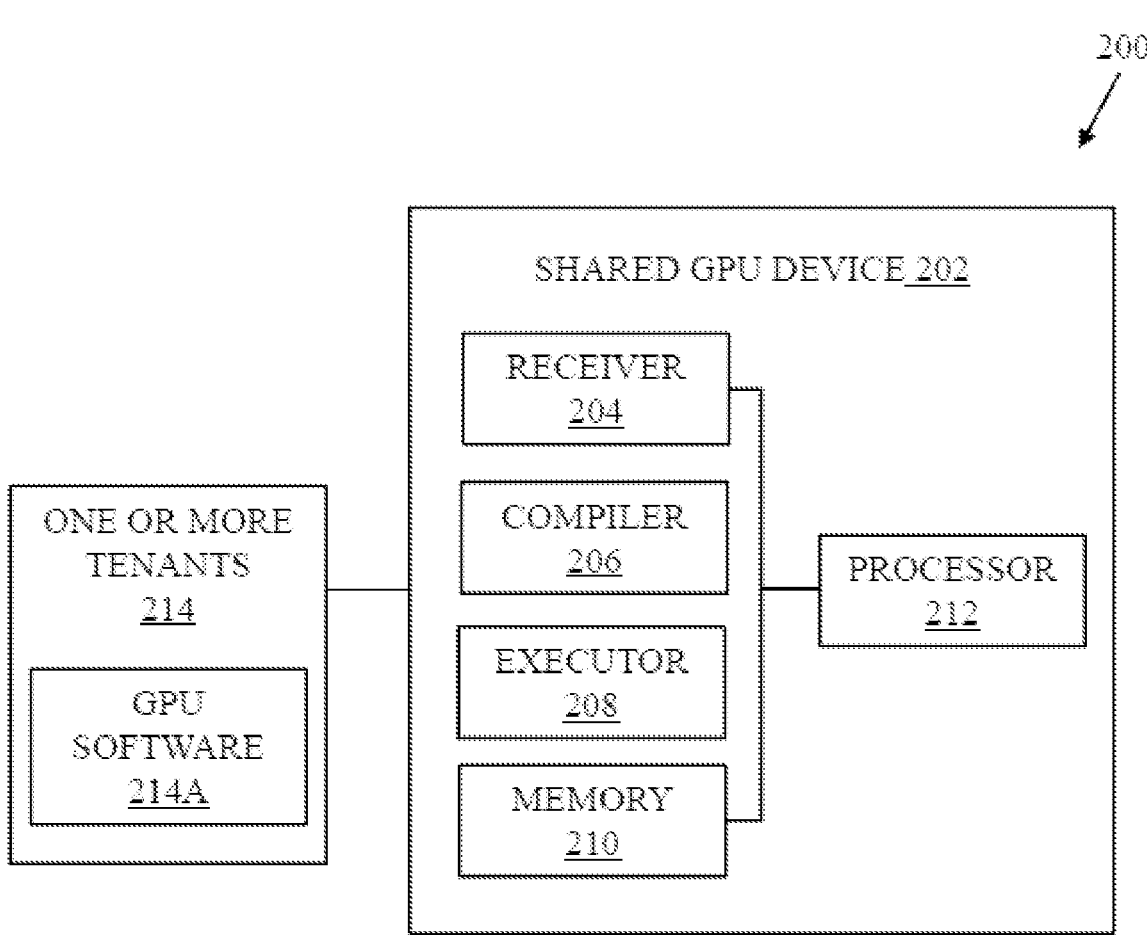
FIG. 2 is a block diagram that illustrates various exemplary components of a shared GPU device, in accordance with an embodiment of the present disclosure.

FIG. 2 is a block diagram that illustrates various exemplary components of a shared GPU device, in accordance with an embodiment of the present disclosure. FIG. 2 is described in conjunction with elements from FIG. 1. With reference to FIG. 2, there is shown a block diagram 200 of a shared GPU device 202. The shared GPU device 202 includes a receiver 204, a compiler 206, an executor 208, a memory 210, and a processor 212. There is further shown one or more tenants 214. Each of the one or more tenants 214 includes a GPU software 214A.

The shared GPU device 202 includes suitable logic, circuitry, interfaces, or code that is configured to execute the method 100 (of FIG. 1). Examples of the shared GPU device 202 include, but are not limited to a host's GPU device, a mainframe computer, and the like. In an example, the shared GPU device 202 may be a single computing device or an electronic device. In another example, the shared GPU device 202 may be a plurality of computing devices, or electronic devices, operating in a parallel or distributed architecture.

The receiver 204 includes suitable logic, circuitry, interfaces, or code that is configured to receive the GPU software 214A from each of the one or more tenants 214 sharing the GPU device 202. Examples of the receiver 204 include, but are not limited to, a data terminal, a facsimile machine, a virtual server, a video monitor, and the like.

The executor 208 includes suitable logic, circuitry, interfaces, or code that is configured to execute each compiled software in turn using the shared GPU device 202. Examples of the executor 208 include, but are not limited to a graphical processing unit such as a graphics card. In an example, the executor 208 may be a single computing device or an electronic device. The executor 208 may be manufactured by various device manufacturing industries, such as Huawei, Nvidia, etc.

The memory 210 includes suitable logic, circuitry, interfaces, or code that is configured to store data and the instructions executable by the processor 212. Examples of implementation of the memory 210 may include, but are not limited to, an Electrically Erasable Programmable Read-Only Memory (EEPROM), Random Access Memory (RAM), Read Only Memory (ROM), Hard Disk Drive (HDD), Flash memory, Solid-State Drive (SSD), or CPU cache memory. The memory 210 may store an operating system or other program products (including one or more operation algorithms) to operate the shared GPU device 202.

The processor 212 includes suitable logic, circuitry, interfaces, or code that is configured to execute the instructions stored in the memory 210. In an example, the processor 212 may be a general-purpose processor. Other examples of the processor 212 may include, but is not limited to a GPU, a CPU, a DSP, a microprocessor, a microcontroller, a complex instruction set computing (CISC) processor, an application-specific integrated circuit (ASIC) processor, a reduced instruction set (RISC) processor, a very long instruction word (VLIW) processor, a CPU, a state machine, a data processing unit, and other processors or control circuitry. Moreover, the processor 212 may refer to one or more individual processors, processing devices, a processing unit that is part of a machine, such as the shared GPU device 202.

In operation, the shared GPU device 202 is configured to receive the GPU software 214A from each of one or more tenants 214 sharing the GPU device 202. The receiver 204 of the shared GPU device 202 is configured to receive the GPU software 214A from each of the one or more tenants 214 sharing the GPU device 202. The GPU software 214A corresponds to a GPU application. The one or more tenants 214 are configured to interact with the shared GPU device 202 using known APIs, for example, CUDA or OpenCL, etc. The one or more tenants 214 may also be referred to as one or more customers, one or more customer devices, one or more clients, or one or more end-users.

The shared GPU device 202 is further configured for each received software, to verify the software is safe to execute, and compiling each software that is verified as safe. For each received software, such as the GPU software 214A, the compiler 206 is configured to verify that the GPU software 214A is safe to execute. After verification, the compiler 206 is further configured to compile the verified GPU software. In a case, the compiler 206 may be configured to fail compilation if the GPU software 214A cannot be verified as safe to execute. But sometimes, the GPU software 214A is safe to execute but cannot be verified as safe. For example, in another case, the compilation fails if the compiler 206 failed to verify the GPU software 214A even the GPU software 214A is safe to execute.

The shared GPU device 202 is further configured to execute each compiled software in turn using the shared GPU device 202. The executor 208 of the shared GPU device 202 is configured to execute the GPU software 214A that is verified as safe to execute and after verification, compiled by the compiler 206.

In accordance with an embodiment, receiving the GPU software 214A includes receiving the software in source form or an intermediate representation, IR form. Each of the one or more tenants 214 (or customers) is configured to provide the GPU software 214A for compilation either in the source form (e.g., a script written in C language) or in the IR form (e.g., a data structure or a code written as LLVM-IR, standard, portable intermediate representation (SPIR), SPIR-V, etc.).

In accordance with an embodiment, receiving the GPU software 214A includes receiving instructions to improve a speed of the verification. Besides receiving the GPU software 214A, the receiver 204 of the shared GPU device 202 is further configured to receive the instructions to improve the speed of the verification of the GPU software 214A. The instructions may correspond to a suggested order to access one or more code blocks in the GPU software 214A. Moreover, the instructions include one or more initialization values for the GPU software 214A.

In accordance with an embodiment, receiving the GPU software 214A includes receiving a cryptographically signed artefact indicating that the software (i.e., the GPU software 214A) has previously been verified. Upon verification and compilation of the GPU software 214A, the compiler 206 is further configured to generate a compiled artefact. The compiled artefact may be the cryptographically signed artefact which indicates that the GPU software 214A has already been verified as safe to execute. Thereafter, the GPU software 214A can be re-used without re-verification.

In accordance with an embodiment, verifying the software (i.e., the GPU software 214A) includes checking one or more entry code blocks to determine one or more memory addresses accessed by the code block, wherein the verification fails if an unsafe memory address is accessed. Before execution of the GPU software 214A, the GPU software 214A is verified by the compiler 206 as safe to execute. The verification of the GPU software 214A includes checking the one or more entry code blocks of the GPU software 214A to determine the one or more memory addresses accessed by the one or more entry code blocks. In a case, if any unsafe memory address is accessed, the verification of the GPU software 214A fails.

In accordance with an embodiment, verifying the software (i.e., the GPU software 214A) includes, for each entry code block: following a path of code blocks that can be accessed from the entry code block, iterating until a steady state of repeated code blocks is reached, and checking memory accessed by all code blocks in the steady state; wherein the verification fails if a steady state cannot be reached or an unsafe memory address is accessed. The verification of the GPU software 214A includes checking of the one or more entry code blocks of the GPU software 214A. The checking of the one or more entry code blocks includes checking of each entry code block. The checking of each entry code block includes following the path of code blocks that can be accessed from the entry code block. The checking of each entry code block further includes iteratively following the path of code blocks until the steady state of repeated code blocks is reached and checking all the memory addresses that are accessed by all the code blocks in the steady state. However, the verification of the GPU software 214A fails if the steady state cannot be reached or the unsafe memory address is accessed. In another embodiment, other techniques for verifying the GPU software 214A may be used, such as weakest pre-condition and strongest post-condition, symbolic and concolic executions, abstract interpretation, bounded model checking, incremental construction of inductive clauses for indubitable correctness, and the like.

In accordance with an embodiment, verifying the software (i.e., the GPU software 214A) includes providing a compiled artefact to the respective tenant to confirm verification. The compiler 206 is configured to verify that the GPU software 214A is safe to execute. During verification, the compiler 206 is configured to provide the compiled artefact to the respective tenant (i.e., one of the one or more tenants 214) to confirm verification of the GPU software 214A.

In accordance with an embodiment, the artefact is cryptographically signed and configured to be used for re-verification of the respective software (i.e., the GPU software 214A). The artefact (or the compiled artefact) is cryptographically signed and can be used for re-verification of the respective software (i.e., the GPU software 214A). The artefact is cryptographically signed to ensure data protection and data authentication among each of the one or more tenants 214.

In accordance with an embodiment, the artefact is configured as a pointer to a compilation result stored remotely. The artefact (i.e., the compiled artefact) is configured to as the pointer or a handle to the compilation result. The compilation result is stored remotely, may be on a host server. The compilation result may include syntactic errors and validation errors and such errors are provided to the respective tenant to fix them. The respective tenant (i.e., one of the one or more tenants 214) cannot modify the pointer or the handle to the compilation result after compilation. Additionally, the compiled artefact may include a verification proof that allows a fast verification when the GPU software 214A is reused. However, sometimes, the verification proof becomes invalid if the GPU software 214A is changed.

In accordance with an embodiment, executing the compiled software includes storing each compiled software in a host driver, and supplying each software to the GPU in turn for execution. After compilation, the GPU software 214A is stored in the host driver and thereafter, the compiled GPU software 214A is supplied to the GPU for execution. Alternatively stated, each of the one or more tenants 214 is configured to tell the GPU to execute the complied GPU software 214A on given buffers. Moreover, only the verified GPU software 214A can run on the GPU.

In accordance with an embodiment, executing the compiled software comprises restricting available functionality of the GPU to exclude one or more functions that cannot be verified. Restricting available functionality of the GPU means that each of the one or more tenants 214 is allowed to use only limited subset of GPU functionality to exclude the one or more functions that cannot be verified. Alternatively stated, the restricting available functionality of the GPU means to ease the verification of the programs which are verifiable or more safe programs can be verified.

Thus, the shared GPU device 202 enables each of the one or more tenants 214 to simultaneously share the GPU without allowing a single tenant to consume a whole GPU. The shared GPU device 202 is based on a basic ability of a device driver (e.g., a driver of the shared GPU device 202) to run a single application and the single application is an amalgamation of one or more programs associated with each of the one or more tenants 214. The shared GPU device 202 requires no expensive context switches. Moreover, the shared GPU device 202 provides a complete isolation between each of the one or more tenants 214 and hence, provides data protection to each of the one or more tenants 214. The data of each of the one or more tenants 214 is protected against any leakage or temperedness. Alternatively stated, the one or more tenants 214 cannot read and write each other's data. Additionally, the shared GPU device 202 provides a simple verification of the GPU software 214A and further allows a lot of GPU codes for reuse. Examples of the GPU codes may include, but are not limited to, Tensorflow, pyTorch, Keras, and the like.

Figure 3:
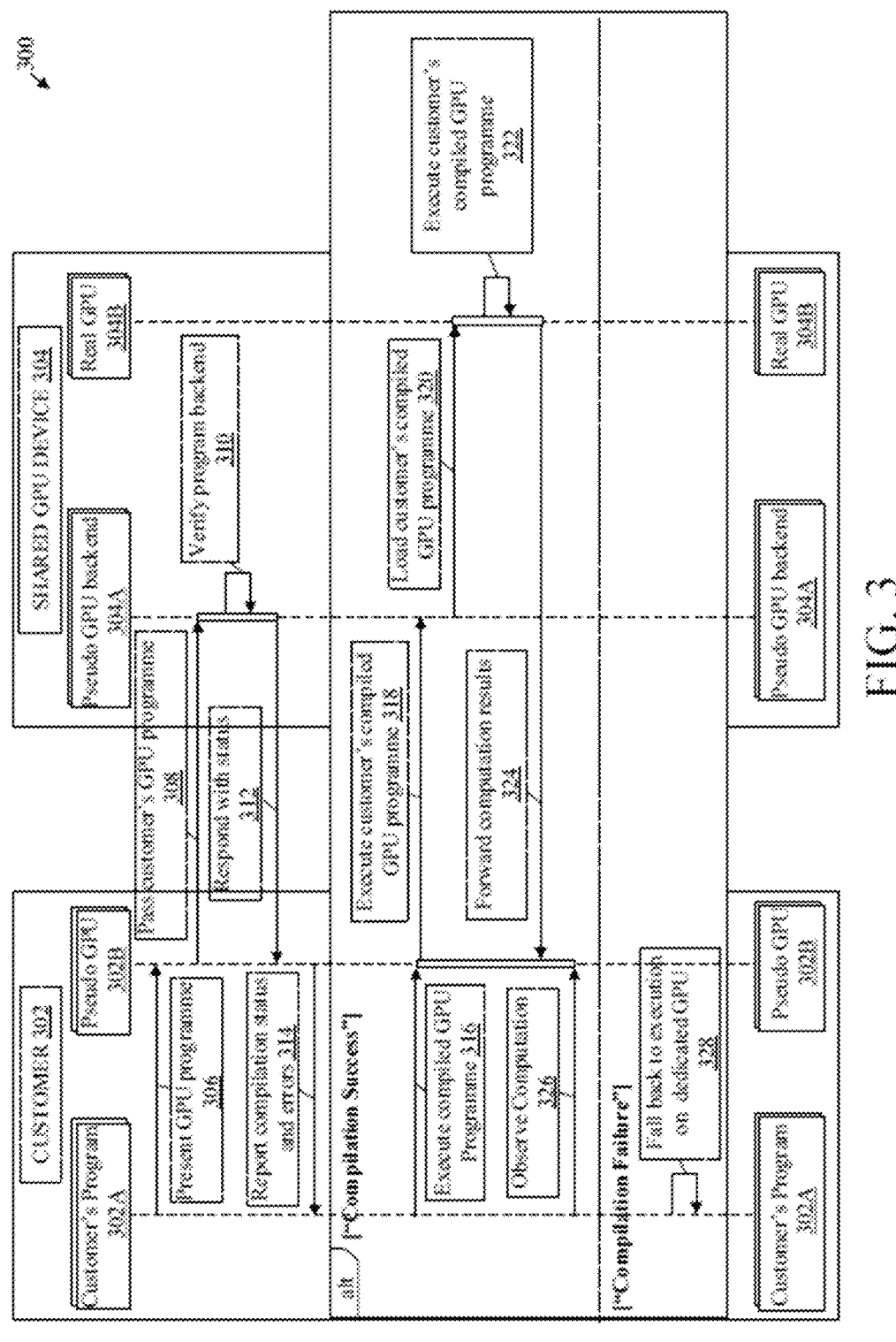
FIG. 3 illustrates an operational flow of a GPU software execution from a customer's perspective, in accordance with an embodiment of the present disclosure.

FIG. 3 illustrates an operational flow of a GPU software execution from a customer's perspective, in accordance with an embodiment of the present disclosure. FIG. 3 is described in conjunction with elements from FIGS. 1, and 2. With reference to FIG. 3, there is shown a flowchart 300 that depicts an operational flow of a GPU software execution from a customer's perspective. The flowchart 300 represents a customer 302 and a shared GPU device 304. The customer 302 includes a customer's program 302A and a pseudo-GPU 302B. The shared GPU device 304 includes a pseudo-GPU backend 304A and a real GPU 304B. There is further shown a series of operations 306 to 328.

The customer 302 and the shared GPU device 304 correspond to the one or more tenants 214 and the shared GPU device 202 (of FIG. 2), respectively. The customer 302 may buy a virtual machine (VM). The customer's program 302A is configured to generate a GPU application that corresponds to the GPU software 214A. The pseudo-GPU 302B corresponds to a virtual GPU device attached to the VM of the customer 302.

At operation 306, the customer's program 302A is configured to generate a GPU application or a GPU program and forward the generated GPU application to the pseudo-GPU 302B.

At operation 308, the pseudo-GPU 302B is configured to forward the generated GPU application to the pseudo-GPU backend 304A of the shared GPU device 304 for verification.

At operation 310, the pseudo-GPU backend 304A is configured to verify that the GPU application is safe to execute. After verification, the pseudo-GPU backend 304A is further configured to compile the verified GPU application.

At operation 312, the pseudo-GPU backend 304A is further configured to respond to the pseudo-GPU 302B by transmitting a compilation status. The compilation status may be a "successful compilation" or a "failed compilation".

At operation 314, the pseudo-GPU 302B is configured to forward the compilation status to the customer's program 302A.

In a first case, if the customer's program 302A receives the compilation status as the "successful compilation", then, a series of operations 316 to 326 is executed. In a second case, if the customer's program 302A receives the compilation status as the "failed compilation", then, an operation 328 is executed.

In the first case, when the customer's program 302A receives the compilation status as the "successful compilation", then, along with the compilation status, the customer's program 302A receives a compiled artefact. The compiled artefact may be a 'handle' or a 'pointer' to compilation results. Thereafter, the series of operations 316 to 326 is executed.

At operation 316, the customer's program 302A is configured to forward the compiled GPU application to the pseudo-GPU 302B.

At operation 318, the pseudo-GPU 302B is configured to forward the compiled GPU application to the pseudo-GPU backend 304A.

At operation 320, the pseudo-GPU backend 304A is configured to load the compiled GPU application to the real GPU 304B for execution.

At operation 322, the real GPU 304B is configured to execute the compiled GPU application of the customer 302.

At operation 324, after execution of the compiled GPU application, the real GPU 304B is configured to forward computation results to the pseudo-GPU 302B.

At operation 326, the customer's program 302A is configured to forward observed computation to the pseudo-GPU 302B. The pseudo-GPU 302B is configured to compare the observed computation from the customer's program 302A and the received computation results from the real GPU 304B.

In the second case, when the customer's program 302A receives the compilation status as the "failure compilation", then the operation 328 is executed.

At operation 328, the GPU application is fall back to execution on a dedicated GPU. The compilation results may include both syntactic errors and validation errors. In some implementations, the customer may also be provided with an opportunity to fix the errors in the compilation results and retry the method.

Figure 4:
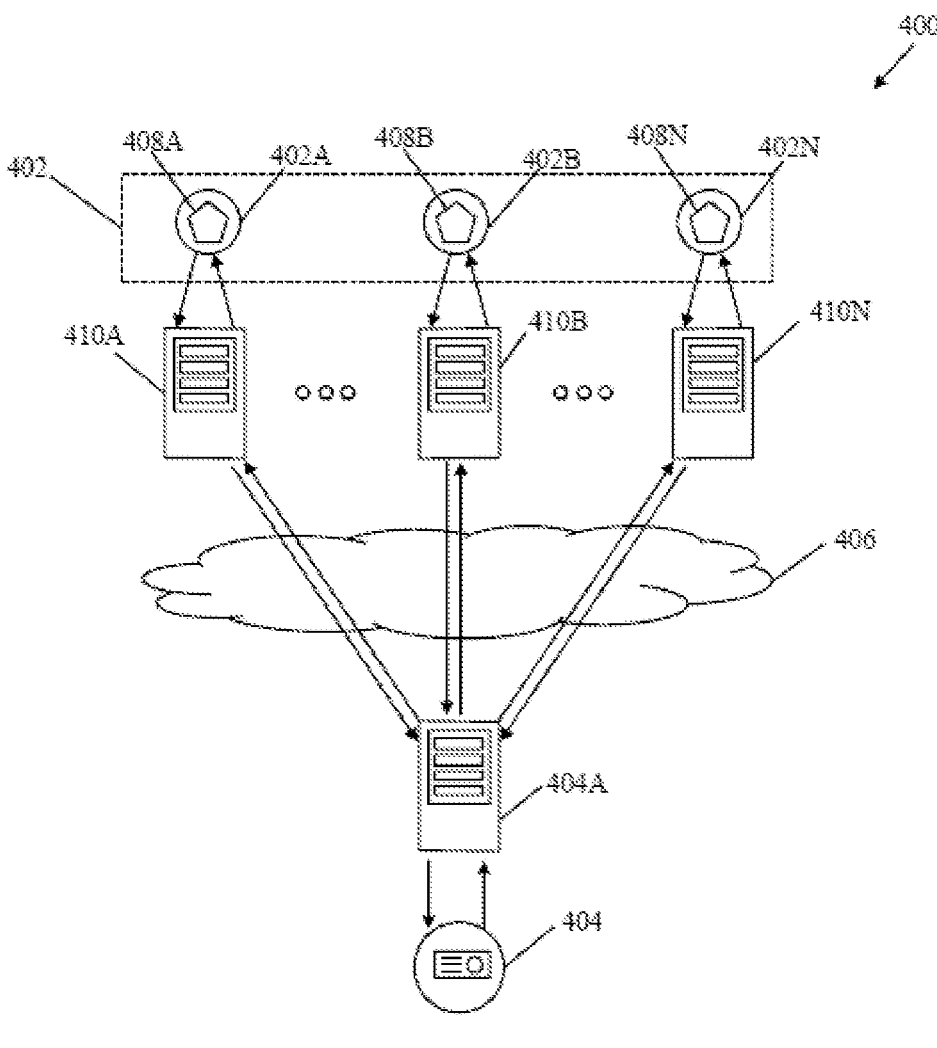
FIG. 4 is a network environment diagram of communication between one or more tenants and a shared GPU device, in accordance with an embodiment of the present disclosure.

FIG. 4 is a network environment diagram of communication between one or more tenants and a shared GPU device, in accordance with an embodiment of the present disclosure. FIG. 4 is described in conjunction with elements from FIGS. 1, 2, and 3. With reference to FIG. 4, there is shown a network environment 400 that includes one or more tenants 402, a shared GPU device 404 and a virtualization layer 406. The one or more tenants 402 includes a first tenant 402A, a second tenant 402B up to an Nth tenant 402N. The shared GPU device 404 includes a host server 404A.

Each of the one or more tenants 402 is configured to generate a GPU application, such as the first tenant 402A generates a first GPU application 408A, the second tenant 402B generates a second GPU application 408B, and the Nth tenant 402N generates a Nth GPU application 408N. Thereafter, the first GPU application 408A, the second GPU application 408B, and the Nth GPU application 408N is forwarded to the host server 404A of the shared GPU device 404 through one or more virtual servers, such as a first virtual server 410A, a second virtual server 410B, up to a Nth virtual server 410N and the virtualization layer 406.

Each of the one or more virtual servers, such as the first virtual server 410A, the second virtual server 410B, and the Nth virtual server 410N may also be referred to as a virtual machine. Moreover, each of the first GPU application 408A, the second GPU application 408B, and the Nth GPU application 408N may also be referred to as a GPU software, such as the GPU software 214A (of FIG. 2).

Each of the one or more tenants 402, such as the first tenant 402A, the second tenant 402B up to the Nth tenant 402N is configured to generate the GPU application, such as the first GPU application 408A, the second GPU application 408B, up to the Nth GPU application 408N with a usual flow of OpenCL. Therefore, each of the one or more virtual servers, such as the first virtual server 410A, the second virtual server 410B, and the Nth virtual server 410N is configured to support OpenCL API.

Each of the GPU application, such as the first GPU application 408A, the second GPU application 408B, up to the Nth GPU application 408N may be generated either in a source form or in an intermediate representation (IR) form.

In order to generate the GPU application in the source form, each of the one or more tenants 402 may use a command "clCreateProgramWithSource". Similarly, in order to generate the GPU application in the IR form, each of the one or more tenants 402 may use a command "clVCreateProgramWithIR". Furthermore, each of the one or more tenants 402, such as the first tenant 402A, the second tenant 402B up to the Nth tenant 402N may also be configured to compile the GPU application, such as the first GPU application 408A, the second GPU application 408B, up to the Nth GPU application 408N using the OpenCL API. A call to OpenCL compilation API (clBuildProgram) includes the following: compiles the GPU application that is generated in the source form to LLVM IR when a source is given, otherwise, converts the GPU application that is generated in the source form to LLVM IR when another IR is given, e.g., SPIR-V. Thereafter, each of the one or more tenants 402 is configured to forward the generated IR to the host server 404A (or a pseudo-GPU backend, such as the pseudo-GPU backend 304A) of the shared GPU device 404. The host server 404A is configured to verify the received IR. The verification of the IR runs outside of the one or more virtual servers, such as the first virtual server 410A, the second virtual server 410B, and the Nth virtual server 410N, hence, outside of the control of the one or more tenants 402. Upon verification success, the host server 404A is configured to return a program pointer to each of the one or more tenants 402 via OpenCL API. Upon verification failure, the API call fails. Moreover, the host server 404A is configured to implement the verification on top of LLVM analysis infrastructure. In case of the verification success, each of the one or more tenants 402 is configured to provide a work buffer which is standard OpenCL API usage. Thereafter, each of the one or more tenants 402 is configured to execute the GPU application (which is successfully verified and compiled) by forwarding the program pointer (or program handle) of the GPU application and the work buffer to the host server 404A (or hypervisor). The host server 404A is configured to load the GPU application and the work buffer and execute the GPU application. Additionally, each of the one or more tenants 402 is configured to use the OpenCL API which is indistinguishable from the API provided to the host server 404A.

Moreover, hardware optimizations can also be applied, such as 0-copy memory lies within the host server 404A (or hypervisor) means that memory can be copied from each of the one or more virtual servers, such as the first virtual server 410A, the second virtual server 410B, and the Nth virtual server 410N to the host server 404A and may be provided back. No additional copies lie on the host server 404A which further save memory and time.

The network environment 400 represents sharing of the GPU device 404 by the one or more tenants 402 in comparison to a conventional approach in which a single tenant is configured to own an entire GPU device which is quite inefficient. However, the network environment 400 illustrates that the one or more tenants 402 simultaneously share the GPU device 404 through the virtualization layer 406 without tampering other tenants' data.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A method implemented by a graphics processing unit (GPU) device, the method comprising:
    receiving GPU softwares from each of one or more tenants sharing the GPU device;
    verifying that the GPU softwares are safe to execute by:
        checking one or more entry code blocks of the GPU softwares to determine one or more memory addresses accessed by the one or more entry code blocks; and
        verifying that the GPU softwares are safe when no unsafe memory address is accessed;
    compiling, when verified as safe, the GPU softwares to obtain compiled GPU softwares; and
    executing the compiled GPU softwares using the shared GPU device.

2. The method of claim 1, wherein the GPU softwares are in a source form or an intermediate representation (IR) form.

3. The method of claim 1, further comprising receiving instructions to improve a speed of the verification of the GPU softwares.

4. The method of claim 1, further comprising receiving a cryptographically signed artefact indicating that the GPU softwares have been previously verified.

5. The method of claim 1, wherein the verification of the GPU softwares fails when the unsafe memory address is accessed.

6. The method of claim 1, wherein verifying the GPU softwares further comprises:
    following, for each entry code block, a path of code blocks that are accessible from the entry code block;
    iterating following the path of code blocks until a steady state of repeated code blocks is reached; and
    checking a memory accessed by all code blocks in the steady state,
    wherein the verification of the GPU softwares fails when a steady state cannot be reached or an unsafe memory address is accessed.

7. The method of claim 1, further comprising providing a compiled artefact to the tenants to confirm verification.

8. The method of claim 7, wherein the compiled artefact is cryptographically signed and configured for re-verification of the GPU softwares.

9. The method of claim 7, wherein the compiled artefact is configured as a pointer to a remotely-stored compilation result.

10. The method of claim 1, further comprising:
    storing the compiled GPU softwares in a host driver; and
    supplying the GPU softwares to the GPU for execution.

11. The method of claim 1, further comprising when executing the compiled GPU softwares, restricting available functionality of the GPU device to exclude one or more functions that cannot be verified.

12. A graphics processing unit (GPU) device comprising:
a memory configured to store instructions; and
one or more processors coupled to the memory and configured to execute the instructions to cause the GPU device to:
    receive GPU softwares from each of one or more tenants sharing the GPU device;
    verify that the GPU softwares are safe to execute by:
        checking one or more entry code blocks of the GPU softwares to determine one or more memory addresses accessed by the one or more entry code blocks; and
        verifying that the GPU softwares are safe when no unsafe memory address is accessed;
    compile, when verified as safe, the GPU softwares to obtain compiled GPU softwares; and
    execute the compiled GPU softwares using the shared GPU device.

13. The GPU device of claim 12, wherein the GPU softwares are in a source form or an intermediate representation (IR) form.

14. The GPU device of claim 12, wherein when executed by the one or more processors, the instructions further cause the GPU device to receive further instructions to improve a speed of the verification of the GPU softwares.

15. The GPU device of claim 12, wherein when executed by the one or more processors, the instructions further cause the GPU device to receive a cryptographically signed artefact indicating that the GPU softwares have previously been verified.

16. The GPU device of claim 12, wherein the verification of the GPU softwares fails when the unsafe memory address is accessed.

17. The GPU device of claim 16, wherein the instructions to verify the GPU softwares comprise further instructions to:
    following, for each entry code block, a path of code blocks that are accessible from the entry code block;
    iterating following the path of code blocks until a steady state of repeated code blocks is reached; and
    checking a memory accessed by all code blocks in the steady state,
    wherein the verification of the GPU softwares fails when a steady state cannot be reached or an unsafe memory address is accessed.

18. The GPU device of claim 12, wherein when executed by the one or more processors, the instructions further cause the GPU device to provide a compiled artefact to the tenants to confirm verification.

19. The GPU device of claim 18, wherein the compiled artefact is cryptographically signed and configured for re-verification of the GPU softwares, or wherein the compiled artefact is configured as a pointer to a remotely-stored compilation result.

20. A computer program comprising computer-executable instructions that are stored on a non-transitory machine-readable storage medium and that, when executed by one or more processors, cause an electronic device to:
    receive graphics processing unit (GPU) softwares from each of one or more tenants sharing a GPU device;
    verify that the GPU softwares are safe to execute by:
        checking one or more entry code blocks of the GPU softwares to determine one or more memory addresses accessed by the one or more entry code blocks; and
        verifying that the GPU softwares are safe when no unsafe memory address is accessed;
    compile, when verified as safe, the GPU softwares to obtain compiled GPU softwares; and
    execute the compiled GPU softwares using the shared GPU device.

* * * * *